June 28, 1966 W. F. KELSEY 3,258,378
METHOD AND APPARATUS FOR FORMING RIBBON OF PARTIALLY
CURED ELASTIC THREADS
Filed Feb. 19, 1962
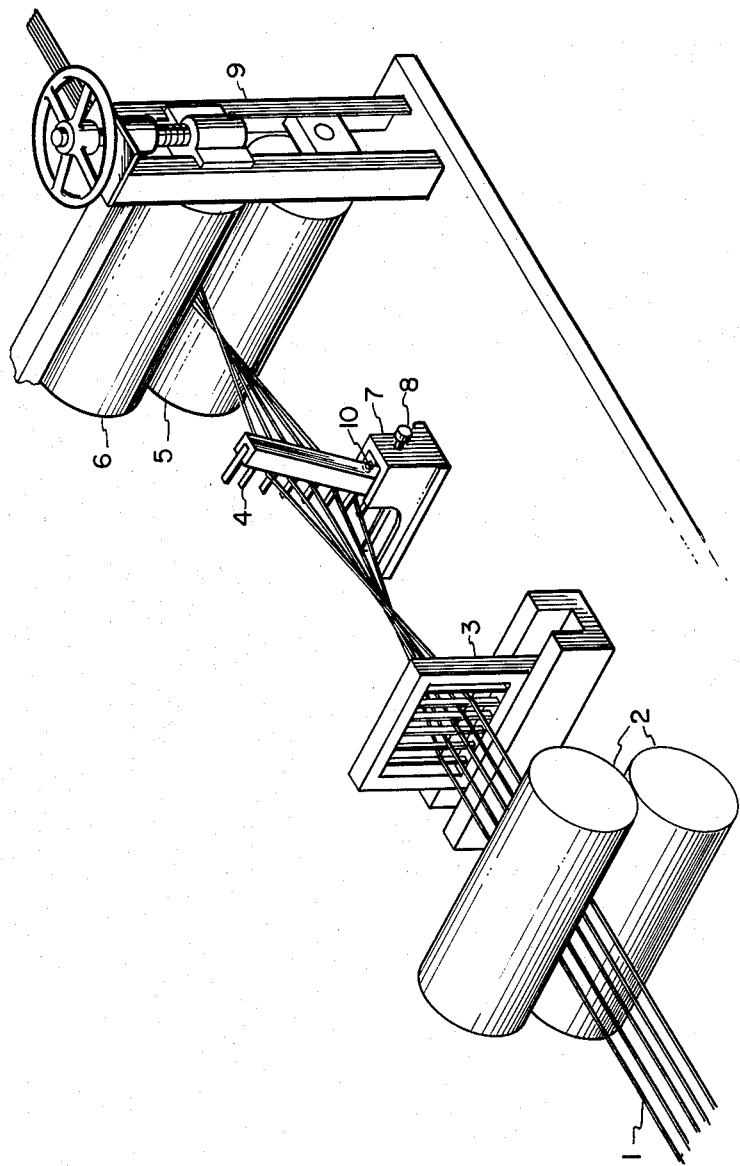
INVENTOR.
WINFIELD F. KELSEY
BY
ATTORNEY

United States Patent Office 3,258,378
Patented June 28, 1966

3,258,378
METHOD AND APPARATUS FOR FORMING RIBBON OF PARTIALLY CURED ELASTIC THREADS
Winfield F. Kelsey, Easthampton, Mass., assignor to United Elastic Corporation, Easthampton, Mass., a corporation of Massachusetts
Filed Feb. 19, 1962, Ser. No. 174,153
7 Claims. (Cl. 156—161)

This invention relates to an improved apparatus and method for producing elastic threads in the form of a ribbon sufficiently adherent to each other so that the ribbon is transportable as such, but having insufficient adherence to prevent separating individual threads for separate use.

Rubber threads have been made either by cutting a sheet or a plurality of stacked sheets and they have also been produced by extrusion of rubber latex into a suitable bath through suitable nozzles. The term rubber, as is usual, includes either natural or synthetic rubbers.

Many problems arose. When individual threads were extruded or cut and vulcanized they had to be wound on separate spools. Particularly in the case of fine gauge threads this enormously increased the expense of winding and shipping and the space required for storage. If the threads could be loosely and temporarily united in the form of a flat ribbon, for example one containing 40 threads side by side, this ribbon could be wound on drums and back wound onto spools or into cartons, and thousands of miles of thread could be shipped in a comparatively small number of cartons of ribbon. This would constitute a great economic saving, and repeated efforts were made, with some success in the case of cut rubber thread. However, when it was attempted to form ribbons from extruded thread, either rubber or other elastomer, the problems became formidable.

It might seem at first glance that it would be a simple matter to cure the threads and then apply a light weak adhesive which adds sufficient strength to hold them together in a ribbon, but insufficient strength to prevent the individual threads from being peeled apart in final use. The attempt was made and true enough the ribbon could be produced but it was practically worthless for most uses, for example knit goods and the like, because the adhesive came off the individual threads when they were separated and deposited in the machinery forming fabrics therefrom.

A proposal was made to vulcanize the rubber partially, leaving some tack, reduce the tack by the application of talc or other powders, and then press the ribbon under high pressure between two rolls using the high pressure to cause sufficient adhesion between the threads of the ribbon so that after finishing the vulcanization it could be transported in ribbon form. This also proved unsatisfactory because the control of the right amount of sidewise adhesion proved too critical for continuous use. It was not inoperative, but the ribbons produced were not sufficiently uniform and left a great deal to be desired.

The next step, which is represented by the Guay Patent 3,009,512, extruded latex into a suitable bath and partially cured it, for example 10 percent or so, then dusted the individual threads with talc. Finally the threads to form the ribbon were pulled under tension across a concave, highly polished roll which imparted a strong sidewise pressure. This pressure urged the threads against each other and then the ribbon formed was passed through two rolls which applied high pressure to the flat surfaces thereof. The theoy of the Guay patent was that when the partially cured threads were stretched the coating of talc was not capable of stretching to the same degree, and therefore minute holes or pores resulted. Then under the heavy pressure of the rolls some of the tacky rubber in the threads was pressed through these holes in the form of minute filaments which attached thread to thread sufficiently so that on vulcanization to completion the threads remained in the ribbon form and could be wound on a drum and back wound in to cartons and transported. When finally used the threads could be pulled apart with ease because the filaments of rubber holding them together were so minute that they tore without injuring the threads themselves.

This method and apparatus proved to be an immediate success, and it represented the best form of ribbon making machinery for rubber threads hitherto developed. However, the Guay process involved problems, particularly the problem of flat ribbons. It is important that the threads in a ribbon remain flat and side by side. However, unless the tension and the sidewise pressure of the curved roller or plate were exactly balanced threads could be forced by the sideways pressure to ride up onto each other. When this occurred, and they passed through the high pressure of the rolls following the sidewise joining of the threads into a ribbon one thread was pressed into another and when the ribbon was used either the threads would tear when pulling apart or would be of uneven thickness, both of which render the product unsatisfactory to the customer. Despite this difficulty the Guay process and machine were extensively used. Failures due to threads riding up on each other were accepted as the necessary price for a practical ribbon making machine.

The present invention, while utilizing some of the concepts underlying the Guay process, produces ribbons by a different method, and one in which there is no possibility of threads being pushed on top of each other, producing faulty ribbons. In other words, the present invention produces ribbons equal to the best that could be made by the Guay process and retains the high quality continuously and without the need for critical manufacturing control.

Essentially the present invention when applied to rubber thread utilizes the first three steps of the Guay process without substantial change, that is to say latex is extruded into threads just as before, these threads are partially cured or vulcanized and are then coated with talc and tension is applied. However, the threads which come widely separated over the conveying rollers from the extrusion bath and the preliminary curing oven then pass through a comb of hard metal, preferably chromium plated, the individual teeth of the comb maintaining the threads separated. These combs are standard articles and are used also by Guay to maintain the threads out of contact with each other until he applies his sideways pressure in the curved roller or plate. However, in the present invention the comb is used in an entirely different manner. Instead of its being parallel to the plane of the threads it is tilted to a steep, but precisely controlled, angle and now the threads leaving the teeth of the comb come down onto the pressure rollers closely adjacent to each other, the spacing being proportional to the cosine of comb tilt from the horizontal. Then the rollers squeeze the still tacky rubber out through the openings in the talc coating, the ribbon is formed and is vulcanized. However, since the threads are laid side by side by a comb which cannot shift, and which lays them down side by side without any significant sideways pressure on the threads after they leave the comb, there is no possibility of one thread riding up on the other due to a side pressure too great for the particular tension existing. Perfect ribbons are produced continuously without any chance of failure and a single comb may perform the functions of a flat comb in Guay with a pressure plate.

The Guay patent limits itself to rubber thread. In this field the present invention is capable of producing perfect ribbons equal to the best that Guay can make, and it produces them continuously with never a failure. In addition the present invention is applicable to other elastic threads, for example modern spandex threads can be made into ribbons with the same continuous reliability as with rubber threads. The present invention is useful with any type of spandex thread, for example dry spun, or wet spun, polyester based threads or polyether based threads. With spandex threads the present invention permits a greater flexibility than Guay does for rubber. It is perfectly possible to use talc, for example suspensions of talc in a bath through which the threads pass before they are formed into a ribbon, but it is not necessary to use talc and tension. It is perfectly possible to incorporate other materials such as certain oils which coat the threads and keep them from sticking together too tightly when they are subjected to pressure and finally cured. Therefore the present invention is not intended to be limited to rubber threads only, but is applicable to any elastic threads, whether rubber, spandex or the like. This additional flexibility and applicability is an advantage of the present invention.

Essentially the process and apparatus of the present invention is not significantly changed when used with spandex threads from that which is employed with rubber threads. There is one characteristic, however, of monofilament spandex threads which must be taken into consideration. These threads are very hard and so it is necessary to make the teeth of the comb which places the threads side by side in ribbon form of highly abrasion resistant material. The simplest type of comb is one with chrome plated teeth, but of course the present invention is not limited to a comb of any particular material. Even with chrome plated teeth comb life is not indefinite, but the life is long and the comb is a very cheap element which can be replaced quickly and easily. With other spandex threads, for example multifilament threads, the abrasion problem is sometimes less severe.

Reference has been made to precise inclination of the comb. This is necessary and a micrometer screw or other precise adjusting means is needed. However, it is not necessary to make the exact screw adjustment whenever a comb is moved. For example, the screw may place a spring pressed frame or abutment against which the comb is firmly held. This makes it possible to swing the comb away from its tilted angle which is sometimes of importance because if a filament breaks it is easier to rethread it through a comb which is more nearly flat. Such mechanical features, while they do not constitute the basic invention, are an indication of its flexibility and practical economic utility. The great advantages of precise location of the threads side by side is combined with a reliability for the comb will not change its position once it has been set. On the other hand, the Guay process, even at best, requires a continuous balancing of tension and sideways compression forces on the threads which must be maintained within definite limits. This is a much more difficult problem than the position of a comb because once the screw adjustment is made it is locked and nothing can shift. Sideways pressure, however, is determined by a number of factors, including the tension, and it is difficult to maintain these constant day after day. This is not to say that Guay is incapable of practical operation, but whereas Guay can occasionally produce faulty ribbons, the present invention produces perfect ribbons continuously and reliably. It thus constitutes an important practical improvement over what can be obtained by the Guay process with rubber threads, and produces the same quality ribbons also with other types of elastic threads.

The invention will be described in connection with the drawings in greater detail. These drawings illustrate only the part of the whole process or machine in which the present invention differs from standard practice. Also, for sake of clarity only five threads are shown. Actually it is common practice to make up ribbons of forty or more threads. Of course, in the case of the present invention this is merely a question of comb width and teeth spacing.

The drawing is isometric and shows the last pair of carrying rolls, the comb of the present invention, and the pressure rolls.

The extruded threads of rubber or of spandex, partially cured, are shown as coming from the left at 1. The extrusion nozzles, coagulating baths and partial curing are not shown, as they are not changed in the slightest by the present invention. The threads, which have been dusted with talc in the case of rubber, or coated with talc or other materials in the case of spandex, pass through two rolls 2. They are maintained straight by a flat comb 3, which however, is not essential to the invention, though desirable for maximum speed of ribbon formation. Then the threads pass through a tilted comb 4, the tilt of which is accurately determined by the frame 7 the tilt of which is adjusted by the micrometer screw 8. The spring 10 presses the frame against the screw. The threads are laid on roll 5 in the form of a ribbon with the threads exactly touching. Pressure is applied by a second roll 6 cooperating with roll 5 and mounted in a framework 9. These two rolls are not different either in design or function from their corresponding elements in the Guay patent, and particularly in the case of rubber thread coated with talc they are operated at a higher speed than the rolls 2 in order to impart the necessary tension to the threads. The pressure slightly flattens the elastic threads and pushes rubber out through interstices in the talc forming thin filaments of rubber precisely as they do in the Guay process, but since there is never any steady sideways pressure on the threads in the ribbon it is impossible for one thread to ride up on the other. After the ribbon is formed it is then fully cured by conventional means, which are not shown, and packed in cartons or other suitable carriers for economical transport.

It will be noted that the threads are kept well separated as they go into the comb 4 and they can easily be observed, as in fact they can be for considerable distance to the left, so that a defective thread can be seen, the machinery stopped, the thread repaired either by sticking to the broken end or by threading through the combs, and the machinery started again. This factor of ready inspection of the threads is of practical importance. In this respect the advantage is shared with that of the Guay machine. Both machines permit inspection, and both have this advantage. The improvement of the present invention over the Guay machine is obtained without any sacrifice of ability to inspect for faulty material.

I claim:

1. In a method of producing a ribbon of partially cured, elastic threads without overriding of threads, by extruding the threads, maintaining them separate, partially curing them until they are still slightly tacky, coating them with a minutely discontinuous nonadhesive coating and arranging the threads in the form of a ribbon with the threads closely adjacent to each other and passing the ribbon through pressure rollers, the improvement which comprises, (a) separating the threads, after coating, along the hypotenuse of a right angled triangle in a plane parallel to the plane of a roller axis and spaced therefrom, one side of the triangle being a line parallel to a roller axis, the cosine of the angle of the hypotenuse with said side multiplied by thread spacings is substantially equal to thread widths whereby the threads are formed into a flat ribbon and pass in such form through the rollers, (b) applying sufficient pressure by means of the rollers to laterally deform the threads of the ribbon to cause portions of the deformed threads to extrude through the interstices of the discontinuous coating to contact next adjacent threads whereby the minute filaments of partially cured thread material bridge from one thread to another, and (c) curing the ribbon.

2. A method according to claim 1 in which (a) the extruded threads are partially vulcanized extruded rubber threads, (b) the threads are coated with finely divided solids, and (c) the threads are stretched before pressure application sufficiently to produce minute discontinuities in the coating of the solids.

3. A method according to claim 2 in which the coating is of talc.

4. In an apparatus for producing a ribbon from individual, partially cured, still slightly tacky, elastic threads having means for coating the threads with a minutely noncontinuous, nonadhesive coating and passing a series of threads in the form of a ribbon between pressure rollers in the plane of the flat dimensions of the ribbon, the threads being sufficiently closely adjacent in passing through the rollers so that compression causes the threads to deform laterally and adhere autogenously to each other with sufficient force for ribbon transport but insufficient to prevent separation of the threads on use, the improvement which comprises means for maintaining the threads separate from each other before passing through the rollers, said means being disposed in a plane parallel to the plane of a roller axis and spaced therefrom and being sufficiently tilted in said plane with respect to a line parallel to a roller axis so that the spacing of the threads multiplied by the cosine of the angle of tilt is substantially equal to the thread widths whereby the threads are positioned in the plane of the rollers closely adjacent to each other and pass through the rollers in the form of a ribbon.

5. An apparatus according to claim 4 in which means are provided for applying tension to the threads after coating and during passage through the rollers.

6. An apparatus according to claim 4 in which the separating means is a comb and micrometric means are provided for adjusting the tilt of the comb to a predetermined point and maintaining it there.

7. An apparatus according to claim 6 in which the comb is removable and is held by a member, the position of which is determined and maintained by the micrometric means.

References Cited by the Examiner

UNITED STATES PATENTS

| 2,954,815 | 10/1960 | Kuts | 156—181 |
| 3,009,512 | 11/1961 | Guay | 156—181 |
| 3,042,569 | 7/1962 | Paul | 156—180 |

FOREIGN PATENTS

| 541,494 | 5/1957 | Canada. |

EARL M. BERGERT, *Primary Examiner.*

R. J. CARLSON, P. DIER, *Assistant Examiners.*